US008542598B2

(12) United States Patent
Corliano et al.

(10) Patent No.: US 8,542,598 B2
(45) Date of Patent: Sep. 24, 2013

(54) METHODS AND APPARATUS FOR PROVIDING CONGESTION INFORMATION

(75) Inventors: Gabriele Corliano, Suffolk (GB); Ben Strulo, Suffolk (GB); Marc Wennink, Suffolk (GB)

(73) Assignee: British Telecommunications public limited company, London (GB)

( * ) Notice: Subject to any disclaimer, the term of this patent is extended or adjusted under 35 U.S.C. 154(b) by 583 days.

(21) Appl. No.: 12/678,841

(22) PCT Filed: Sep. 19, 2008

(86) PCT No.: PCT/GB2008/003177
§ 371 (c)(1),
(2), (4) Date: Mar. 18, 2010

(87) PCT Pub. No.: WO2009/037466
PCT Pub. Date: Mar. 26, 2009

(65) Prior Publication Data
US 2010/0208591 A1    Aug. 19, 2010

(30) Foreign Application Priority Data

Sep. 19, 2007  (EP) .................................. 07253702

(51) Int. Cl.
*G06F 11/00*  (2006.01)
(52) U.S. Cl.
USPC .......................................... 370/237; 370/252
(58) Field of Classification Search
USPC ............... 370/229–238.1, 252, 253, 412, 413
See application file for complete search history.

(56) References Cited

U.S. PATENT DOCUMENTS

| | | | |
|---|---|---|---|
| 5,901,147 A * | 5/1999 | Joffe | 370/412 |
| 6,865,185 B1 * | 3/2005 | Patel et al. | 370/412 |
| 6,970,426 B1 * | 11/2005 | Haddock | 370/235.1 |
| 7,327,682 B2 | 2/2008 | Gandhi et al. | |
| 2007/0153682 A1 | 7/2007 | Swenson et al. | |

FOREIGN PATENT DOCUMENTS

| | | |
|---|---|---|
| CN | 1781287 A | 5/2006 |
| WO | 2006/079783 | 8/2006 |

OTHER PUBLICATIONS

International Search Report for PCT/GB2008/003177, mailed Feb. 3, 2009.
Written Opinion of the International Searching Authority for PCT/GB2008/003177, mailed Feb. 3, 2009.

(Continued)

*Primary Examiner* — Yemane Mesfin
*Assistant Examiner* — Mon Cheri Davenport
(74) *Attorney, Agent, or Firm* — Nixon & Vanderhye P.C.

(57) ABSTRACT

Methods and systems for providing information relating to congestion at a network element caused by data units intended to be forwarded across a telecommunications network by the network element, the apparatus comprising: load-data receiving means for receiving load data relating to data units intended to be forwarded by the network element; rate-data obtaining means for obtaining data indicative of a configurable rate; first and second registers for storing first and second metrics; first and second updating means operable to update the metrics in said first and second registers in dependence on said load data and on the configurable rate; and a congestion indication provider operable to provide indications of congestion in dependence on the metrics stored in the registers; said apparatus being configured in such that it may provide behavior equivalent to a virtual queue marking scheme by virtue of a minor modification to hardware provided for Single Rate Three Color Marking.

24 Claims, 6 Drawing Sheets

VQM using Modified srTCM Hardware

(56) References Cited

OTHER PUBLICATIONS

Kunniyur et al., "An Adaptive Virtual Queue (AVQ) Algorithm for Active Queue Management", IEEE / ACM Transactions on Networking, IEEE / ACM, New York, NY, US, vol. 12, No. 2, Apr. 1, 2004, pp. 286-299, XP001193290.

Lapsley, "Random Early Marking: An Optimisation Approach to Internet Congestion Control", Department of EEE, The University of Melbourne, Australia, 8 pages, 1999.

Translation of Office Action issued in Chinese Application No. 200880107948X (10 pgs.).

* cited by examiner

Figure 1 - Overview of a network element

Figure 2 – Virtual Queue Marking (VQM)

Figure 3 - Token Bucket Marking (TBM)

Figure 4 - Single Rate Three Colour Marking (srTCM)

Figure 5 – VQM using Modified srTCM Hardware

METHODS AND APPARATUS FOR PROVIDING CONGESTION INFORMATION

This application is the U.S. national phase of International Application No. PCT/GB2008/003177 filed 19 Sep. 2008, which designated the U.S. and claims priority to European Application No. 07253702.0, filed 19 Sep. 2007, the entire contents of each of which are hereby incorporated by reference.

TECHNICAL FIELD

The present invention relates to telecommunications networks such as the Internet, an intranet, or a core network of a network operator. More specifically, aspects of the present invention relate to methods and apparatus for providing information relating to congestion at network elements caused by data units intended to be forwarded across a network.

BACKGROUND TO THE INVENTION AND PRIOR ART

Packet Networks such as Internet Protocol (IP) networks or Ethernet networks typically operate on a "Best Efforts" basis. This means that they usually forward their data units or packets quickly across the network, but may occasionally experience congestion when they receive more packets than can be forwarded quickly. In this case they typically delay or drop excess packets, which may cause inconvenience to the senders or receivers of the packets.

Techniques have been developed to provide a more discriminating forwarding behaviour by, for example, giving some packets priority, or higher priority than others, based for example on which of a number of different traffic classes they are identified as belonging to, or on their source or intended destination. Such techniques typically need to be complemented by mechanisms such as Admission Control mechanisms which may be used to control the rate at which the high (or higher) priority packets enter the network, in order to prevent them from being able to congest or monopolise the resources of the network to the extent that they completely exclude packets having lower priority from the network. By appropriate use of such mechanisms and appropriate configuration, the resources available to the network may effectively be partitioned in such a way as to ensure that the network will not accept higher priority packets at a higher rate than the rate at which the network can actually guarantee to provide such packets with priority treatment, while also ensuring that packets having lower priority can not be completely excluded.

Other schemes for controlling congestion rely on the network providing a signal to the senders or receivers of packets when congestion is experienced allowing them to "back-off", i.e. to reduce the rate at which packets are being sent and thereby alleviating the congestion.

Recent approaches to managing congestion in the Internet and other networks require routers (or switches) in the network to perform Active Queue Management and to signal congestion using some marking scheme. The router chooses a proportion of the packets being forwarded based on its current congestion level and then marks them with a congestion mark typically using a protocol such as ECN (RFC 2481—A Proposal to add Explicit Congestion Notification (ECN) to IP). If the router is uncongested then very few packets will be marked. If the router is congested many (or all) packets will be marked.

With reference to FIG. 1, an overview of a generalised network element, such as a router or switch, is shown. Flows of packets arrive at the network element from other nodes in a network via one or more network interfaces, and are presented for onward transmission to other nodes in the network via another network interface. If the network element is performing a packet marking process to indicate congestion, a packet-marking means is present at the network element or one or more of its network interfaces.

Existing mechanisms for marking packets are typically based upon inspecting the real queue of packets at the router (or switch) interface and marking the packets if this queue is long. An example of such an approach is given in "Random Early Marking: An Optimization Approach to Internet Congestion Control" by David Lapsley and Steven Low (Proceedings of the 7th IEEE International Conference on Networks, 28 Sep.-1 Oct., 1999). Such techniques are not difficult to implement with current switches and routers. However, they are not entirely satisfactory because they do not start to signal congestion until the real queue starts to grow in size. It is preferable to generally operate the network so that real queues very seldom grow in size since long queues mean increased latency and packet loss. Thus it would be better if the marking mechanism could start marking in the presence of imminent congestion before the real queue start to grow.

Virtual Queue Marking

An example of such early marking is being standardised in the IETF PCN Working Group (http://www.ietf.org/html-.charters/pcn-charter.html), where PCN refers to "Pre-Congestion Notification". This working group is trying to standardise a marking mechanism based on looking at how the arrival rate of packets compares not to the line rate (as the real queue does) but instead to a slightly reduced rate. This "virtual queue" experiences congestion before the real queue does and hence can provide more timely congestion signals. An academic discussion of the advantages of such a mechanism is given in "Resource pricing and the evolution of congestion control" by R. J. Gibbens and F. P. Kelly (Automatica 35, 1999). Virtual queues were first proposed in a different form (and for use in ATM networks) in "Buffer Overflow Asymptotics for a Switch Handling Many Traffic Sources" by Costas Courcoubetis and Richard Weber (Journal of Applied Probability 33, pages 886-903, 1996). The precise form discussed here was proposed by Kunniyur and Srikant in "Analysis and Design of an Adaptive Virtual Queue (AVQ) Algorithm for Active Queue Management" (Proc. ACM SIG-COMM'01, Computer Communication Review 31 (4), October 2001).

It will be noted that the term "virtual queue" is also used in switch and router hardware design to denote a virtual queue on an ingress interface that tracks the queue on an egress interface, but this has no relation to the virtual queue discussed here.

Virtual Queue Marking (VQM) defines a strategy—to be implemented on network interfaces—to mark packets of a packet-switched network with a signal expressing the state of congestion of that interface. This packet marking strategy is based on a congestion measurement defined by a virtual queue. A virtual queue is a conceptual queue that is actually simply a single variable recording the length of the virtual queue, where the lengths of packets are added to it as they arrive while some fraction of the line rate of that interface is subtracted at the same time. This means that an interface's virtual queue builds up more rapidly than its real queue.

FIG. 2 shows a model illustrating a Virtual Queue Marking (VQM) process. As each new packet arrives and is added to the real queue, the size of the virtual queue is incremented by the number of bytes in the new packet. If packets are able to be presented for onward transmission to other nodes in the network at a rate of X bytes per second (bps), the virtual queue is decremented at a rate of θX bps, where θ<1.

The size of the virtual queue is then used to decide whether or not to send a congestion signal (i.e. a signal expressing a state of congestion for that interface). Typically we would wish to send a congestion signal if the size of the virtual queue exceeds some threshold. There are several ways of coding a congestion signal; a desirable way is to 'mark' a packet, by setting a bit in the packet header to 1 if the signal is 'congested interface', or to 0 if the signal is 'uncongested interface'. Another possible way of using the measurement of congestion that the virtual queue provides, rather than marking packets, is to send an alert to a management system. Alternatively, but less desirably, the traffic class of the real packet may be re-marked, or the real packet might be dropped or re-routed.

Token-Bucket Marking

There are compelling reasons to desire the implementation of a virtual queue marker in real routers and switches but current routers typically cannot support such a marker. They typically only provide support for marking based on the size of the real queue.

However, the hardware that routers use is often provided with additional capabilities, that are used to police traffic flows (or some particular subset of the router traffic) to some configured rate lower than the line rate. These capabilities use a marking mechanism that sees the traffic in this subset and then marks it (typically not with an ECN mark but in some other way, such as changing the Differentiated Services Code Point (DSCP) of the packet). Since these marking mechanisms are configurable to operate at a lower rate than the line rate, they could provide support for a virtual queue. However, these markers typically do not use the discipline used for a virtual queue. Typically they are based on what are referred to as token buckets (or leaky buckets) which mark packets when they become empty.

A typical such marking mechanism is to use a token bucket, as indicated by FIG. 3, which shows a model illustrating a Token Bucket Marking (TBM) process. The token bucket B is (notionally) filled with tokens at a configured rate (the Committed Information Rate or CIR), and is emptied of tokens as packets arrive. Again, if packets are able to be presented for onward transmission at a rate of X bps, the virtual queue is decremented at a rate of θX bps, where θ<1. C indicates the maximum number of tokens which can be in the token bucket, and $T_c$=current number of tokens in bucket. A packet marker marks packets according to a predetermined token consumption and packet marking algorithm before presenting the packets for onward transmission.

Thus this appears similar to a virtual queue operating upside-down. However, the core difference is that it only marks packets while it is empty of tokens. In contrast, a virtual queue will typically mark whenever it is above a threshold which is well away from the end of the queue. The token bucket would achieve the same behaviour only if it marked whenever its level fell below a threshold configured well above its empty point. However, to implement a virtual queue in hardware requires additional registers and is a non-trivial change to the implementation of a token bucket.

Virtual Queue Vs. Token Bucket Marking

Using a token bucket in this way then results in a marking mechanism which has less memory than a virtual queue: following a burst of packets, the token bucket quickly stops marking whereas the virtual queue continues to mark until the real queue has had time to drain back to empty. A virtual queue thus marks as much traffic as there was in the burst since marking started, which more accurately reflects the impact the packet stream is having on the real queue, and is thus preferred as a congestion marking mechanism. This is termed "marking symmetry", which is preferred because the amount of marking accurately reflects the economic cost of the congestion caused, so markings may then be used as an accounting metric and not just as a control signal.

Routers and switches often, as well as providing simple token buckets, also provide for a marking mechanism called Single Rate Three Colour Marking (IETF RFC 2697—srTCM). For example, many router and switch manufacturers use the Broadcom 56510 chipset for queue management, which includes a hardware implementation of srTCM marking. Further information about the Broadcom 56510 chipset is available from Product Brief BCM56510 at www.broadcom.com/collateral/pb/56510-PB00-R.pdf, or from Broadcom Corporation, 16215 Alton Parkway, Irvine, Calif., US.

The srTCM mechanism is modelled as involving two token buckets, B1 and B2, as depicted in FIG. 4. The level of tokens in buckets B1 and B2 are respectively $T_C$ and $T_E$, and the maximum number of tokens in the buckets are C and E.

The srTCM mechanism aims to mark packets with one of three states often termed "green", "yellow" and "red". The Committed Information Rate (CIR) is the rate at which tokens are pushed into the bucket, and this corresponds to a traffic rate below which all packets are expected to be marked green. The Committed Burst Size (CBS) is the size of bucket B1 (i.e. this is C), which corresponds to the maximum size of the burst which will not cause any yellow (or red) marking. The Excess Burst Size (EBS) is the size of bucket B2 (i.e. this is E), which corresponds to the maximum size of the burst which will not cause yellow marking to go into red marking.

There are two main algorithms defined by srTCM: the way tokens fill the two buckets, and the way tokens are consumed by packets.

Token Consumption and Packet Marking Algorithm

Every time a packet of size B arrives, the srTCM marker performs the marking algorithm in order to perform the following steps:

```
if (T_C > B) then
    mark packet green
    T_C = T_C - B
else if (T_E > B) then
    mark packet yellow
    T_E = T_E - B
else
    mark packet red
```

In practice token consumption algorithms may also handle cases where the fill of a bucket is less than packet size B, typically by emptying the bucket to zero and if necessary removing the remainder from the other bucket. Other implementations allow the bucket to go slightly negative. Such detail has been omitted here to emphasise the primary intent of the algorithm.

Token Filling Algorithm

The two token buckets are filled at a specified committed information rate R by a single source of tokens according to the following algorithm invoked repeatedly every F/R seconds:

```
if (T_C < C) then increase T_C by F
else if (T_E < E) then increase T_E by F
```

Equivalently, the following fill algorithm may be triggered by each packet arrival event, rather than regular timer events:

```
t_now := now( )
F := R(t_now − t_previous)
if (T_C < C) then increase T_C by F
else if (T_E < E) then increase T_E by F
t_previous := now( )
```

Virtual Queue Marking is simple to implement in software, but there are currently no hardware implementations of it, at least not on low-end, general purpose hardware. It will be understood that hardware implementation (rather than software implementation) is advantageous for high speed, simple operation. Current routers and switches typically implement three alternative mechanisms to make measurements at network interfaces: token bucket marking (TBM), Single Rate Three Colour Marking (srTCM), and Two Rate Three Colour Marking (trTCM).

It will be understood that TBM could be modified to behave identically to VQM by adding a threshold to the token bucket (a threshold above which the marker starts marking). Unfortunately this is a route that involves considerable re-design of the hardware, however.

Instead, srTCM inherently introduces a mechanism that uses two token buckets. Although the point of the two buckets (in srTCM as it is) is to allow for exceeding tokens from bucket B1 to overflow into B2, the inventors have realised that by modifying the algorithm through which tokens are pushed into the buckets, it is possible to use the size of one bucket as the threshold of a virtual queue.

Referring to prior art patent publications, U.S. Pat. No. 6,970,426, which could be considered to be of background relevance, relates generally to the field of data communications, and in particular to a device metering a received data stream and marking packets in the data stream differently, for example, based on one factor, or a combination of one or more factors, such as packet rate, packet length, time of arrival of a packet in the data stream, etc. A packet may be marked, and remarked, for example, to indicate a level of assurance as to whether the packet is forwarded or discarded.

European patent application EP 1,694,004 relates to a network device for processing data in a network, and in particular to a process of controlling the flow of data through the network device that is said to allow for enhanced processing speeds and expandability. Use of the above for programmable colour marking, as well bucket incrementing and decrementing, is discussed, and in particular versions, the use of programmable registers to implement the srTCM and the trTCM methods is discussed.

Referring to the academic literature, a more recent paper by Kunniyur & Srikant: "An Adaptive Virtual Queue (AVQ) Algorithm for Active Queue Management" (IEEE/ACM Transactions on Networking, Vol. 12, No. 2, April 2004), which could also be considered to be of background relevance, studies the properties of virtual queues, and considers a particular scheme, referred to as the Adaptive Virtual Queue (AVQ). A discussion is included of how the AVQ may be implemented as a simple token bucket using only a few lines of code.

SUMMARY OF THE INVENTION

According to a first aspect of the present invention, there is provided an apparatus for providing information relating to congestion at a network element caused by data units intended to be forwarded across a telecommunications network by the network element, the apparatus comprising:

load-data receiving means for receiving load data relating to data units intended to be forwarded by the network element;

rate-data obtaining means for obtaining data indicative of a configurable rate, said configurable rate relating to a rate at which data units are to be forwarded by the network element;

a first register for storing a first metric;

a second register for storing a second metric;

first updating means operable to update the metric in at least one of said first and second registers in dependence on said load data, said first updating means having a primary association with one of said first and second registers and having a secondary association with the other of said first and second registers, said first updating means being operable to update the register with which said first updating means has a primary association in the event that such an update would not cause the metric stored in that register to cross a predetermined threshold, and in the event that such an update would cause the metric stored in that register to cross a predetermined threshold, to update the register with which said first updating means has a secondary association in the event that such an update would not cause the metric stored in that register to cross a predetermined threshold;

second updating means operable to update the metric in at least one of said first and second registers in dependence on the configurable rate, said second updating means having a primary association with one of said first and second registers and having a secondary association with the other of said first and second registers, said second updating means being operable to update the register with which said second updating means has a primary association in the event that such an update would not cause the metric stored in that register to cross a predetermined threshold, and in the event that such an update would cause the metric stored in that register to cross a predetermined threshold, to update the register with which said second updating means has a secondary association in the event that such an update would not cause the metric stored in that register to cross a predetermined threshold; and a congestion indication provider responsive to said first updating means and operable to provide an indication of a primary level of congestion in the event that an update by said first updating means to either of said first and second registers would cause the metric stored in that register to cross its respective threshold;

characterised in that the register having a primary association with the first updating means is the register having a secondary association with the second updating means.

It will be understood that the terminology used in the above definition, whereby each of the two updating means is said to have a "primary association" with one of the two registers and a "secondary association" with the other of the two registers, would, in the absence of the limitation set out in the "characterising" clause, effectively divide the scope of the above definition into four corresponding categories of apparatus. The restriction set out in the "characterising" clause results in the scope of the above definition covering just two of these categories, which can be summarised as follows:

1) apparatus in which the first updating means (which is operable to update the metric in at least one of the two registers in dependence on the load data) has a primary association with the first register and a secondary association with the second register, while the second updating means (which is operable to update the metric in at least one of the two registers in dependence on the configurable rate) has a primary association with the second register and a secondary association with the first register; and 2) apparatus in which the first updating means has a secondary association with the first register and a primary association with the second register, while the second updating means has a secondary association with the second register and a primary association with the first register.

The terminology used in the definition above, whereby the respective updating means are said to have "primary" and "secondary" associations with the respective registers, has been used in order to enable the two categories of apparatus summarised above to be covered by the single definition above, the restriction set out in the "characterising" clause serving to exclude the other two categories of apparatus from the scope of the definition. It should be clear from the wording of the above definition that the register with which an updating means is said to have its "primary association" is the register which that updating means is primarily operable to update (i.e. it is the register which that updating means "preferentially" updates in the event that such an update would not cause the metric stored in that register to cross a predetermined threshold). The register with which an updating means is said to have its "secondary association" is the register which that updating means may update "otherwise" (again with a possible proviso that such an update might not be done if doing it would cause the metric stored in that register to cross a predetermined threshold).

In the event that it is believed that this results in overly-complex language, it should be noted that the single definition above could be replaced either by two separate definitions in the above "two-part" form, one corresponding to each of the "categories" of apparatus set out above, or by a single definition in a "one-part" form (i.e. a definition without "pre-characterising" and "characterising" clauses.

Suitable wording for a corresponding definition in "one-part" form of the first aspect is as follows: an apparatus for providing information relating to congestion at a network element caused by data units intended to be forwarded across a telecommunications network by the network element, the apparatus comprising:

load-data receiving means for receiving load data relating to data units intended to be forwarded by the network element;

rate-data obtaining means for obtaining data indicative of a configurable rate, said configurable rate relating to a rate at which data units are to be forwarded by the network element;

a first register for storing a first metric;

a second register for storing a second metric;

first updating means operable to update the metric in at least one of said first and second registers in dependence on said load data, said first updating means being operable to update the first register in the event that such an update would not cause the metric stored in the first register to cross a predetermined threshold, and in the event that such an update would cause the metric stored in the first register to cross a predetermined threshold, to update the second register in the event that such an update would not cause the metric stored in the second register to cross a predetermined threshold;

second updating means operable to update the metric in at least one of said first and second registers in dependence on the configurable rate, said second updating means being operable to update the second register in the event that such an update would not cause the metric stored in the second register to cross a predetermined threshold, and in the event that such an update would cause the metric stored in the second register to cross a predetermined threshold, to update the first register in the event that such an update would not cause the metric stored in the first register to cross a predetermined threshold; and a congestion indication provider responsive to said first updating means and operable to provide an indication of a primary level of congestion in the event that an update by said first updating means to either of said first and second registers would cause the metric stored in that register to cross its respective threshold.

As a result of the limitation set out in the characterising clause of the two-part definition above (which has been incorporated fully into the one-part definition above) in combination with the features of the associated pre-characterising clause, in preferred embodiments, the two updating means may be thought of as effectively using the two registers as the "top" and "bottom" of a combined register which changes one way in response to load and the other in response to the passing of time. This behaviour corresponds to that of a Virtual Queue, thus preferred embodiments enable Virtual Queue Marking to be implemented using the two registers described, which are already available on packet-forwarding equipment, albeit in a new manner.

The load data may relate to the number of data units intended to be forwarded by the network element, or to the size (e.g. number of bytes or bits) of data units intended to be forwarded by the network element, or may be a combination of these factors indicative of the combined load of data units currently at the ingress of the network element, for example.

The configurable rate may be a rate set by a network operator or some other entity in advance, or may be determined by the network operator, at a network element, at the apparatus itself, by some other entity, or otherwise, in response to current conditions or requirements. It may be configured to be at a rate a predetermined amount below the rate at which data units can (or can generally) be forwarded by the network element, and may be used in order to determine at what fraction of its total capacity the network element may start to react to potential congestion, for example.

In certain situations, specific congestion indications may be required in respect of contributions to congestion at the network element attributable to a specific subset (or combination of subsets) of the data units (e.g. data units of a specific traffic class, data units from a specific source, and/or data units destined for a specific destination). In such situations there may be a configurable rate relating to the rate at which data units from just the specific subset (or subsets) are to be forwarded, for example. Alternatively, separate congestion indications may be required in respect of contributions to congestion at the network element separately attributable to each of a plurality different subsets of data units. In such situations different configurable rates may apply in relation to each subset.

The first and second updating means may be operable to update the metrics in the first and second registers by amounts dependent respectively on the load data and on the configurable rate.

The first updating means may be operable to update the metrics in the first and second registers by incrementing them in dependence on the load data, while the second updating means may be operable to update the metrics in the first and second registers by decrementing them in dependence on the configurable rate. Alternatively, the first updating means may be operable to update the metrics in the first and second registers by decrementing them in dependence on the load data, while the second updating means may be operable to update the metrics in the first and second registers by incrementing them in dependence on the configurable rate. Either way, it will be understood that one of the updating means performs the function equivalent to "filling token buckets" in the token bucket model in dependence on the configurable rate, while the other updating means may counteract this by performing the function equivalent to "emptying token buckets" in accordance with the amount of data being forwarded by the network element.

The predetermined thresholds in respect of the first and second registers may be set such as to correspond to the concept of the first and second buckets being empty or full in the token bucket model, or may be set at levels other than this.

The congestion indication provider may be operable to provide indications of a secondary, possibly higher or more critical level of congestion in the event that updates by the first updating means to the first and second registers would cause the metrics stored in each register to cross their respective thresholds. Indication of a secondary level of congestion would generally be distinguishable from indications of a primary level of congestion.

The apparatus may additionally comprise data unit marking means, responsive to the congestion indication provider, operable to mark data units in response to indications of congestion provided by the congestion indication provider. Alternatively, it may be arranged to send an alert to a network management system, or drop or re-route data units in response to indications of congestion provided by the congestion indication provider.

The telecommunications network may the Internet, an intranet, or a core network of a network operator, for example.

The data units may be packets each comprising a header in accordance with an inter-networking protocol such as a version of Internet Protocol (IPv4, IPv6 etc.). Alternatively, the data units may be frames in accordance with an intra-networking protocol such as a version of Ethernet Protocol. This may be particularly appropriate where the telecommunications network is a core network. Another alternative, which may also be appropriate where the telecommunications network is a core network, is that the data units may be cells in accordance with an Asynchronous Transfer Mode (ATM) protocol, for example.

It will be understood that the apparatus itself may be an adapted router or other network element, or may be incorporated into an existing router or other network element as an accessory. An alternative possibility is that the apparatus according to the invention may be associated with, but not actually incorporated into, a router or other network element.

A network element may comprise, incorporate or be associated with more than one apparatus according to the invention. This may be appropriate in situations where separate congestion indications are required in respect of contributions to congestion at the network element that are separately attributable to different subsets of data units, such as different classes of data units, or to data units from different sources and/or data units destined for different destinations, for example.

According to a second aspect of the present invention, there is provided a method for providing information relating to congestion at a network element caused by data units intended to be forwarded across a telecommunications network by the network element, the method comprising steps of:

receiving load data relating to data units intended to be forwarded by the network element;

obtaining data indicative of a configurable rate, said configurable rate relating to a rate at which data units are to be forwarded by the network element;

storing a first metric in a first register;

storing a second metric in a second register;

performing a load-dependent operation of updating the metric in at least one of said first and second registers in dependence on said load data, said load-dependent operation having a primary association with one of said first and second registers and having a secondary association with the other of said first and second registers, said load-dependent operation involving updating the register with which the load-dependent operation has a primary association in the event that such an update would not cause the metric stored in that register to cross a predetermined threshold, and in the event that such an update would cause the metric stored in that register to cross a predetermined threshold, updating the register with which the load-dependent operation has a secondary association in the event that such an update would not cause the metric stored in that register to cross a predetermined threshold;

performing a rate-dependent operation of updating the metric in at least one of said first and second registers in dependence on the configurable rate, said rate-dependent operation having a primary association with one of said first and second registers and having a secondary association with the other of said first and second registers, said rate-dependent operation involving updating the register with which the rate-dependent operation has a primary association in the event that such an update would not cause the metric stored in that register to cross a predetermined threshold, and in the event that such an update would cause the metric stored in that register to cross a predetermined threshold, updating the register with which the rate-dependent operation has a secondary association in the event that such an update would not cause the metric stored in that register to cross a predetermined threshold; and providing an indication of congestion in the event that an update to either of said first and second registers resulting from said load-dependent operation would cause the metric stored in that register to cross its respective threshold;

characterised in that the register having a primary association with the load-dependent operation is the register having a secondary association with the rate-dependent operation.

Suitable wording for a corresponding definition in "one-part" form of the second aspect is as follows: a method for providing information relating to congestion at a network element caused by data units intended to be forwarded across a telecommunications network by the network element, the method comprising steps of:

receiving load data relating to data units intended to be forwarded by the network element;

obtaining data indicative of a configurable rate, said configurable rate relating to a rate at which data units are to be forwarded by the network element;

storing a first metric in a first register;

storing a second metric in a second register;

performing a load-dependent operation of updating the metric in at least one of said first and second registers in dependence on said load data, said load-dependent operation involving updating the first register in the event that such an update would not cause the metric stored in the first register to cross a predetermined threshold, and in the event that such an update would cause the metric stored in the first register to cross a predetermined threshold, updating the second register in the event that such an update would not cause the metric stored in the second register to cross a predetermined threshold;

performing a rate-dependent operation of updating the metric in at least one of said first and second registers in dependence on the configurable rate, said rate-dependent operation involving updating the second register in the event that such an update would not cause the metric stored in the second register to cross a predetermined threshold, and in the event that such an update would cause the metric stored in the second register to cross a predetermined threshold, updating the first register in the event that such an update would not cause the metric stored in the first register to cross a predetermined threshold; and providing an indication of congestion in the event that an update to either of said first and second registers resulting from said load-dependent operation would cause the metric stored in that register to cross its respective threshold.

Preferred options and alternative versions corresponding to those set out above in relation to the first aspect of the invention exist also in relation to the second aspect.

In the following section we describe a way to make what may appear to be a minor modification to the hardware provided for srTCM in order to implement instead a virtual queue marking scheme. Embodiments of the present invention exploit the features of the srTCM mechanism but modify the mechanism in order to deliver the features of a virtual queue. Although the modification may require changes to the hardware used to perform the marking, the changes may be small. Thus embodiments of the invention enable the implementation of a virtual queue to be provided very easily building on existing equipment design, rather than requiring the design of new hardware.

BRIEF DESCRIPTION OF THE DRAWINGS

Preferred embodiments of the present invention will now be described with reference to the appended drawings, in which.

DESCRIPTION OF PREFERRED
EMBODIMENTS OF THE INVENTION

With reference to the accompanying Figures, an apparatus for providing congestion information according to a preferred embodiment of the invention will be described.

Figure 4:
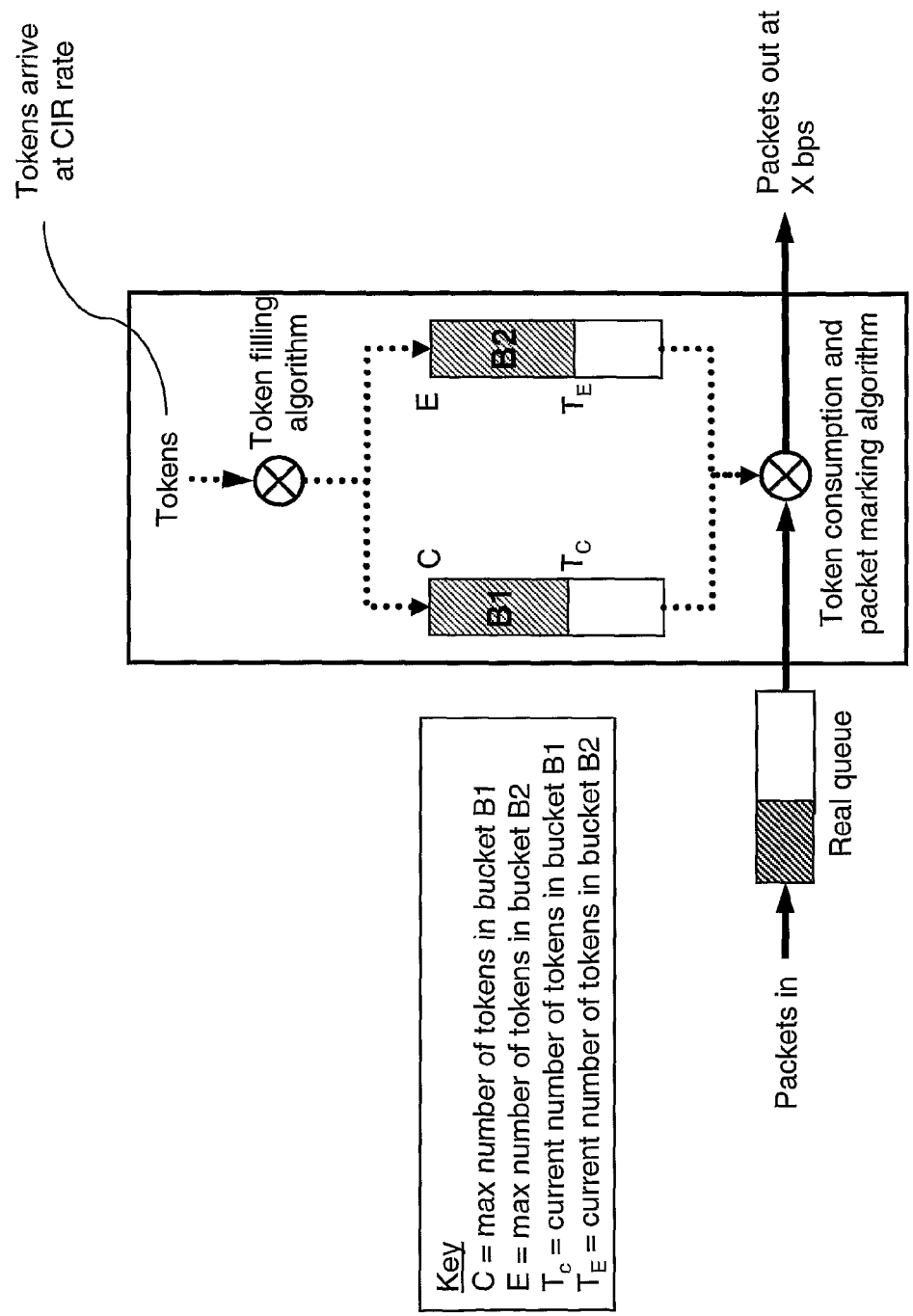
FIG. 4 illustrates how a Single Rate Three Colour Marking (srTCM) process may be performed.

The present invention has emerged from an analysis by the present inventors of the behaviour of srTCM, discussed above with reference to FIG. 4. It was found that it was possible to use the principle of the two communicating token buckets to obtain the same behaviour as is made possible by use of a VQM strategy. In particular, the way in which the two buckets are filled up with tokens is modified by swapping the order in which this occurs.

Figure 2:
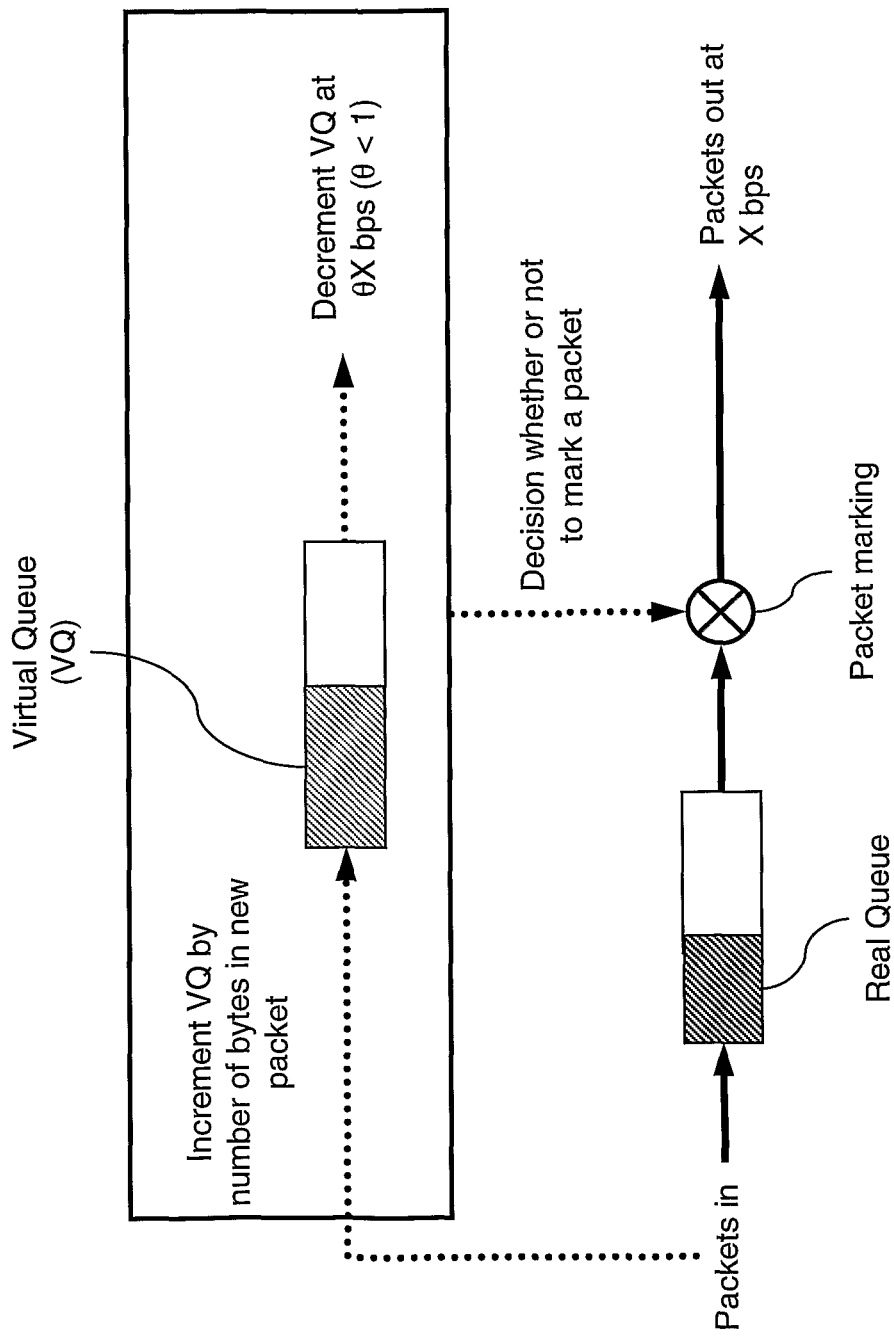
FIG. 2 shows a model illustrating a Virtual Queue Marking (VQM) process.
Figure 3:
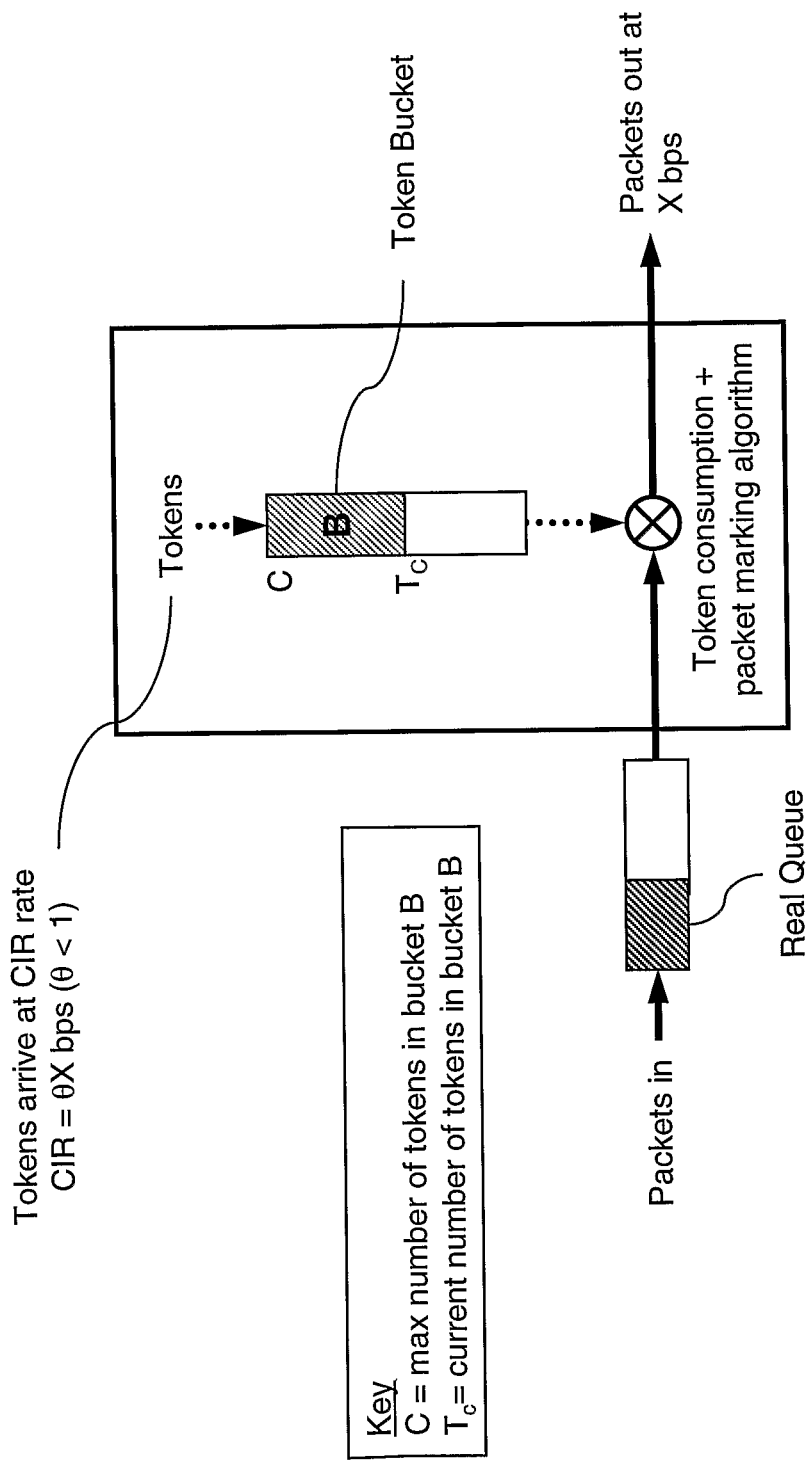
FIG. 3 shows a model illustrating a Token Bucket Marking (TBM) process.

This simple modification results in a new mechanism which may have exactly the same behaviour as VQM, discussed above with reference to FIG. 2, and it also has the advantage of using as its start-point standard building blocks which have already been implemented in existing hardware such as that already available for srTCM. According to one version, the modification suggested consists in effectively swapping two lines of the filling algorithm, such that the token buckets are now filled according to the following:

if ($T_E$ < E) then increase $T_E$ by F
else if ($T_C$ < C) then increase $T_C$ by F The consequence is to create a mechanism which emulates VQM operating at the same rate and with a maximum queue length of C+E and a threshold of C. Then if the mechanism is in state ($T_C$, $T_E$), this is exactly equivalent to VQM with a queue length of (C+E−$T_C$−$T_E$). Furthermore, the mechanism can be made to precisely implement the VQM process simply by marking the packet with a congestion signal whether the listed algorithm marks a packet red or yellow. The marking algorithm could involve standard techniques such as setting a bit in one or more packets to '1' to indicate congestion or to '0' otherwise, re-marking the traffic class of packets, or dropping or re-routing packets. Alternatively, the marking algorithm could be more complicated, involving marking packets with a marking probability that is a function of $T_E$ for example (marking with a low probability when $T_E$ is near to E, but marking with a probability approaching 1 as $T_E$ approaches 0).

Figure 1:
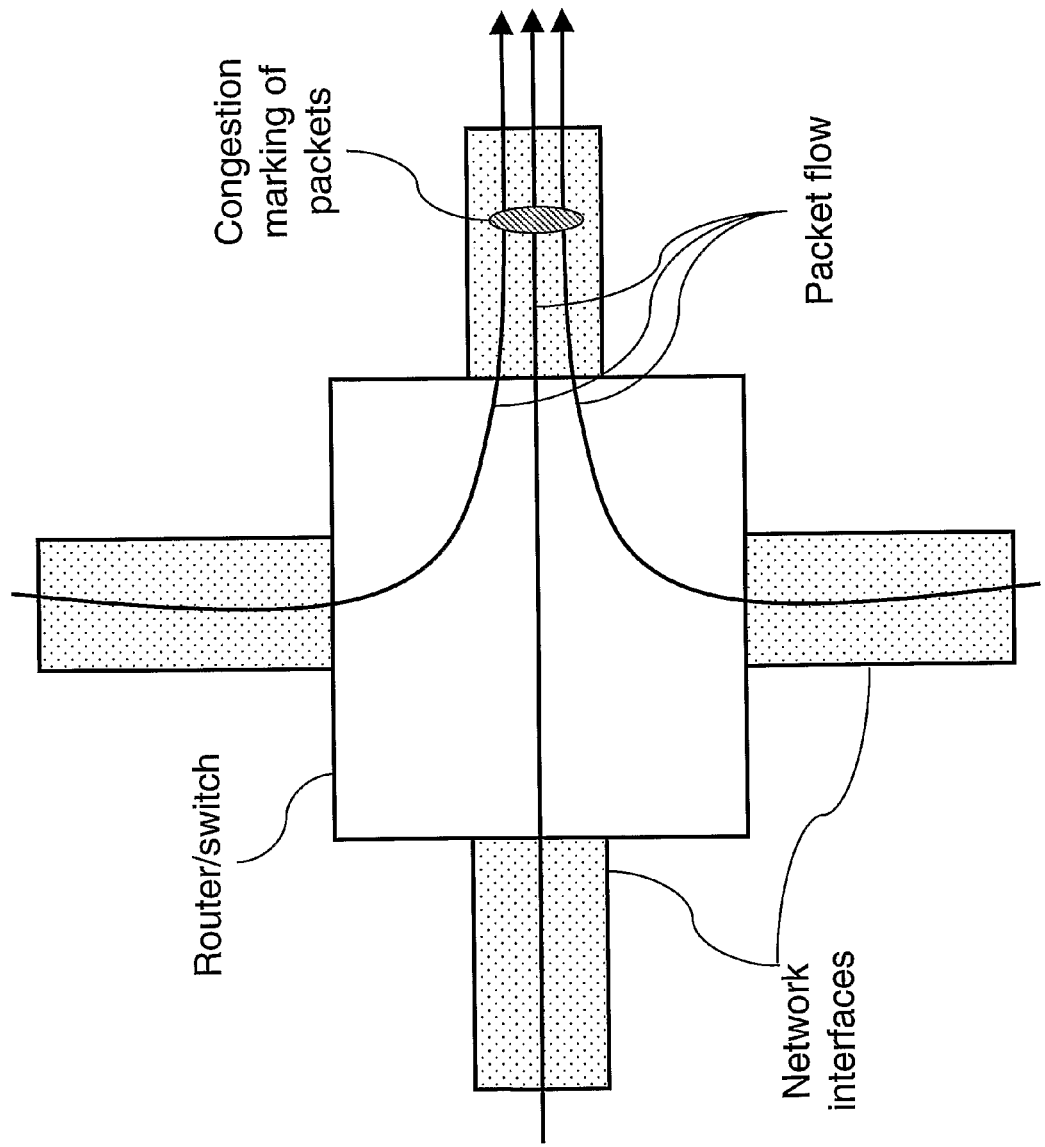
FIG. 1 shows an overview of a network element, such as a router or switch.

An example illustrating how VQM may be implemented using congestion information apparatus according to a first embodiment, using suitably modified hardware based on that intended for srTCM, will now be described with reference to FIG. 5, which shows packets from a source 10 arriving (possibly via other network elements which are not shown) at a network element 20 such as a router or switch, which subsequently forwards them on (again possibly via other network elements which are not shown) towards a destination 30. For simplicity, only a sub-section of a very simple path is shown—a network element may of course receive packets from or via more than one upstream path (like that of FIG. 1) and forward packets along or via more than one downstream path in a network such as that shown in FIG. 6, but such additional paths are not shown in FIG. 5 in the interests of clarity.

Figure 5:
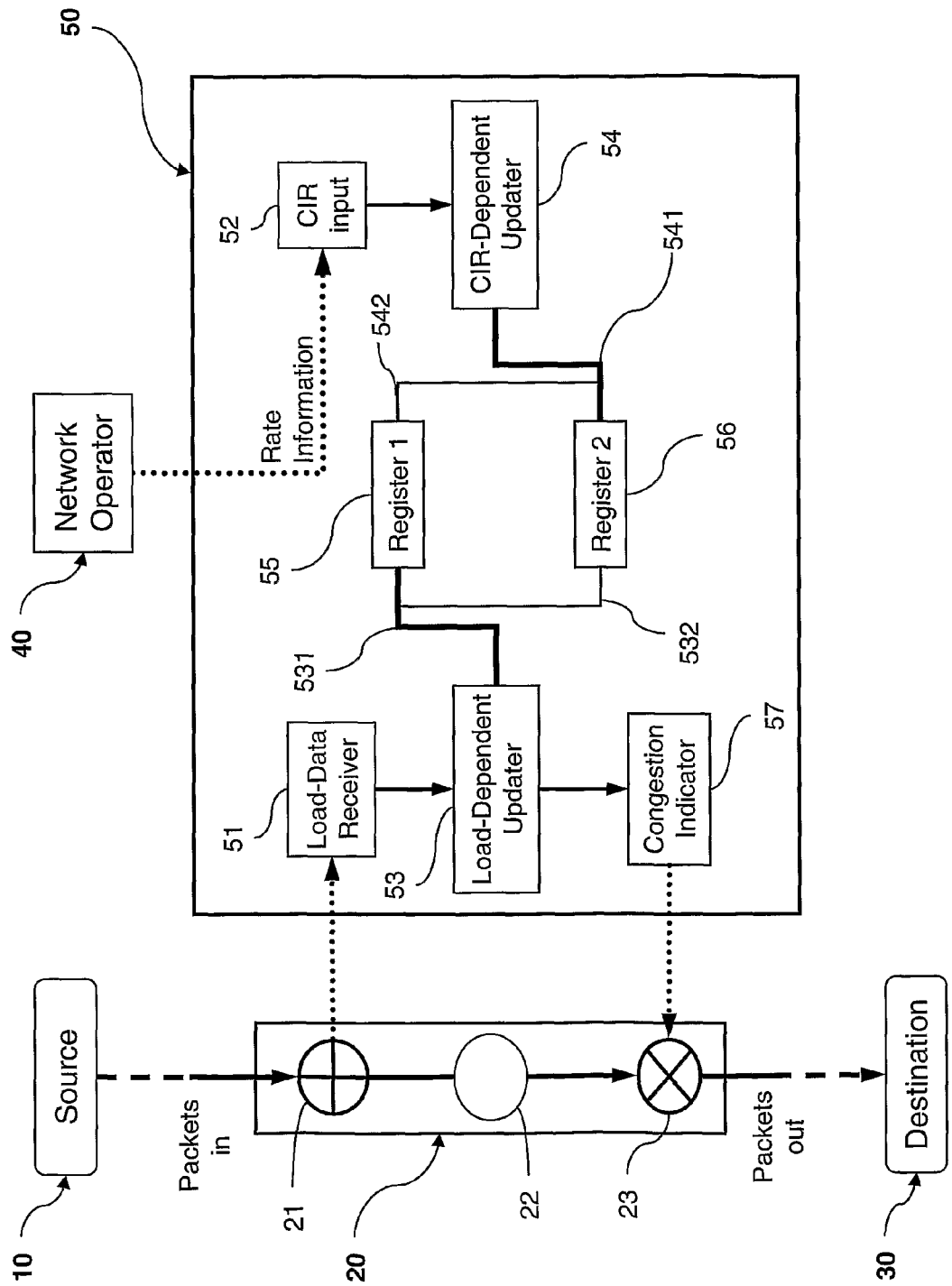
FIG. 5 illustrates how Virtual Queue Marking (VQM) may be implemented using modified Single Rate Three Colour Marking (srTCM) hardware.
Figure 6:
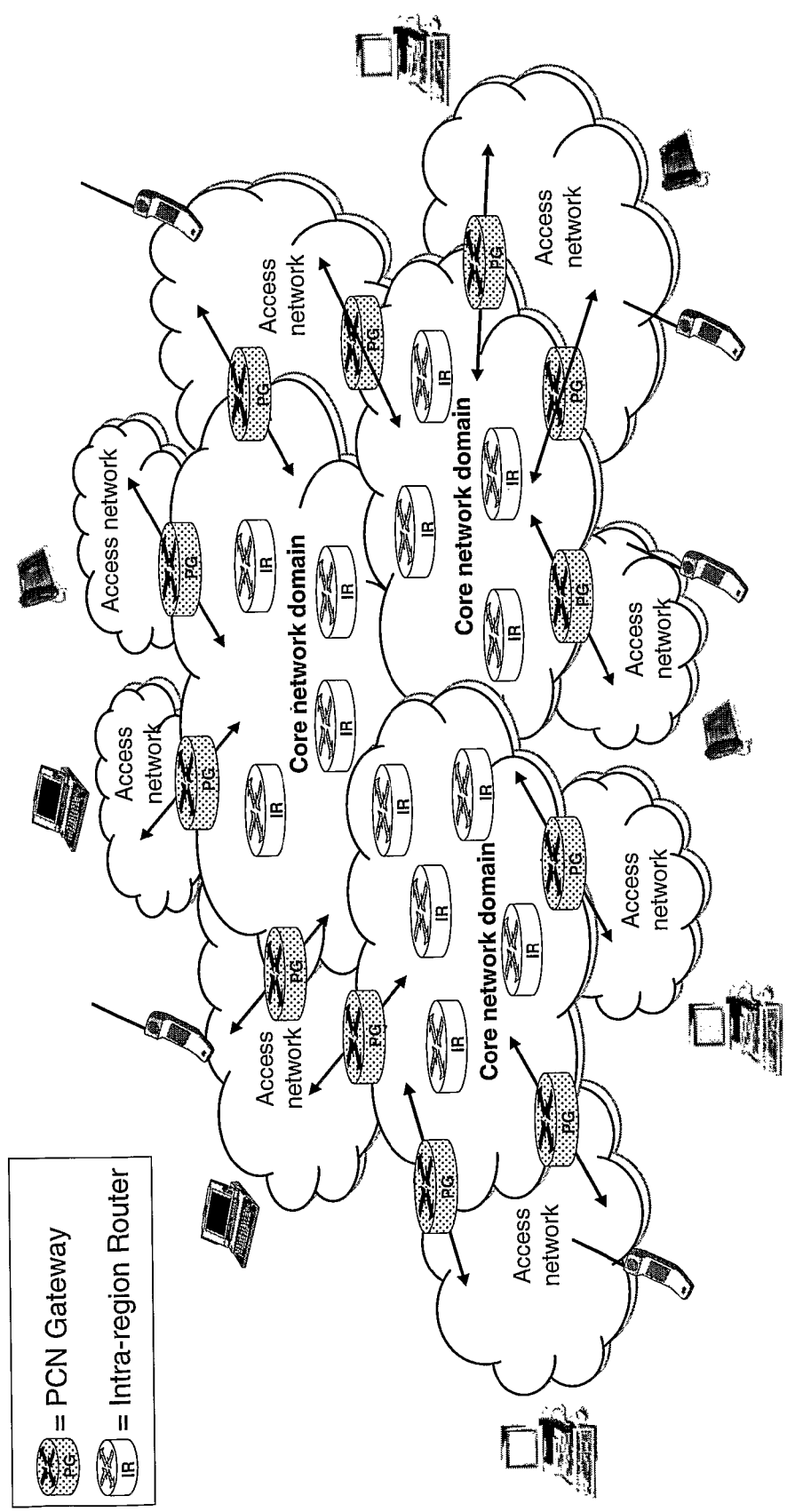
FIG. 6 illustrates a part of a network having core network domains and access networks.

The network element 20 is shown in FIG. 5 as having a packet monitor 21 which is capable of determining and providing load data relating to some measure of the amount of packets arriving at an ingress of the network element which are intended to be forwarded by the network element, or the rate at which packets are arriving over a period of time, for example. The packet monitor 21 may also be capable of determining and providing other information about the packets, such as the traffic class or classes they belong to, the source from which they have been received (which may be the original sender of the packets, the direct neighbouring network element from which they have arrived, or one or more other network elements in between), the destination for which they are to be forwarded (again, direct, eventual receiver or intermediate), and/or other such information. The network element 20 is also shown as having a routing component 22 responsible for determining a downstream route for received packets, and a packet treatment component 23 which may be a packet marker or a packet dropper, for example, which will be discussed further later.

A congestion information apparatus 50 is shown as a module separated from the network element 20. It will be understood however that the apparatus may form a part of or be incorporated into a network element (or vice versa) or alternatively be associated with, but not actually incorporated into a network element.

The apparatus 50 has a load-data receiver component 51 which receives load information from the packet monitor 21 relating to packets intended to be forwarded by network element 20. The apparatus 50 also has a CIR input component 52 for accessing rate information relating to the rate at which received packets are intended to be forwarded by the network element 20, or possibly various different rates at which various different subsets of received packets are intended to be forwarded. This rate information may be received from a possibly remote network operator 40, who may be responsible for configuring the rate or rates in order to satisfy network requirements, or may be determined and/or configured locally or remotely from knowledge or analysis of demand and capacity in the network, for example.

The apparatus 50 has a first register 55 for storing a first metric, and a second register 56 for storing a second metric. The registers 55, 56 may simply be memories capable of storing a value which may be incremented or decremented, or may be implemented in other ways.

The apparatus 50 has a first "load-dependent" updater component 53, which is responsive to the load-data receiver component 51 and is able to update the metric in at least one of registers 55, 56 in dependence on load information received by the load-data receiver component 51 from the packet monitor 21. The apparatus 50 also has a second "configured rate-dependent" updater component 54, which is responsive to the CIR input component 52 and is able to update the metric in at least one of registers 55, 56 in dependence on rate information received by the CIR input component 52 concerning the configurable rate or rates. The operation of the respective updater components 53, 54 will be described in the following paragraphs.

While each of the updater components 53, 54 may be capable of updating each of the registers 55, 56, the load-dependent updater component 53 is primarily associated with the first register 55, and secondarily associated with second register 56 in the sense that updater component 53 first (or preferentially) attempts to update the first register 55, and does so unless such an update would cause the metric stored in register 55 to cross a predetermined threshold. If such an update would cause the metric stored in register 55 to cross the threshold, updater component 53 instead attempts to update the second register 56, and does so unless such an update would cause the metric stored in register 56 to cross a predetermined threshold. In this respect, updater component 53 is said to have a primary association (symbolised by thick line 531) with register 55, and only a secondary association (symbolised by thin line 532) with register 56.

Correspondingly, the configured rate-dependent updater component 54 is primarily associated with the second register 56, and secondarily associated with first register 55 in the sense that updater component 54 first (or preferentially) attempts to update the second register 56, and does so unless such an update would cause the metric stored in register 56 to cross a predetermined threshold, in which case it instead attempts to update the first register 55, and does so unless such an update would cause the metric stored in register 55 to cross a predetermined threshold. Updater component 54 is thus said to have a primary association (symbolised by thick line 541) with register 56, and only a secondary association (symbolised by thin line 542) with register 55.

It should be understood that the situation where updater component 53 has its primary association 531 with register 55 and updater component 54 has its primary association 532 with register 56 is equivalent (so far) to a corresponding situation where updater component 53 instead has its primary association with register 56 and updater component 54 instead has its primary association with register 55, but these situations would differ topologically and functionally from situations in which the two updater components 53, 54 have their primary associations with the same register.

Finally, the apparatus 50 has a congestion indicator 57 which is responsive to the load-dependent updater component 53 and is able to provide an indication of congestion in the event that it is determined (by updater component 53 or otherwise) that updates by updater component 53 to either of the registers 55, 56 would cause the metric stored therein to cross the respective threshold.

Congestion indications may be provided by the congestion indicator 57 to the packet treatment component 23 which may, as a result, mark, drop or otherwise treat one or more packets, possibly of a particular subset of packets with which the apparatus 50 is concerned, for example. Alternatively, congestion indications provided by the congestion indicator 57 may result in an alert being sent to a network management system, which may take appropriate action itself, for example.

The above implementation corresponds to what was described earlier as "switching around" the filling algorithm from what can be regarded as the normal mode of operation of srTCM.

In an alternative embodiment, the consumption algorithm rather than the filling algorithm may be switched round, switching every occurrence of $T_E$ or $T_C$ with each other.

In a second alternative, depending on the specific way the hardware has been implemented, even if it is not easy to switch the order of the logic, it may be possible to configure C=E and switch round the values in the two variable $T_E$ and $T_C$ before and after each invocation of the above srTCM filling algorithm (or equivalently before and after invocation of the above consumption algorithm).

---

$T_S := T_C; T_C := T_E; T_E := T_S$
if ($T_C$ < C) then increase $T_C$ by F
else if ($T_E$ < E) then increase $T_E$ by F
$T_S := T_C; T_C := T_E; T_E := T_S$

---

Of course, the token bucket depths could be switched with each other by switching pointers around rather than moving the values themselves, and similarly, C and E could be switched too if they were not equal.

In relation to some embodiments, an aim of the virtual queue may be to mark all packets when the configurable rate is exceeded. This configurable rate may be related to the overall throughput of the element in a variety of ways, however. For example, in a typical scenario, a network element such as a switch may handle multiple classes of traffic. It might be desired to use the virtual queue to control the rate of just one of those traffic classes. In this case, the switch may mark packets when traffic in that class exceeds its allowance, which might be a certain percentage of the maximum rate, but could alternatively be a specific value (say, 100 Mbps) derived from knowledge, analysis etc. of demand and capacity in the network. It will therefore be understood that the configurable rate need not be set just in dependence on the maximum rate (though it would generally be less). Instead a variety of considerations may be involved, possibly including Service Level Agreements (SLAs), demand, topology etc.

The configurable rate may indicate, set or affect the rate above which data units should be specially treated by the network element, for example, where the "special treatment" may be marking, but other options such as dropping are of course possible.

It will be understood that components of apparatus 50 such as the load-data receiver component 51, the CIR input component 52, the two updater components 53 and 54, the two registers 55 and 56, and the congestion indicator 57 need not be separate physical components of the apparatus 50. The functions attributed to some or all of them may in fact be performed by the same processor of apparatus 50, for example, with the results of processing to achieve the functionality attributed to one component then being used (where applicable) in subsequent a routine whereby to achieve the functionality attributed to another.

The invention claimed is:

1. An apparatus for providing information relating to congestion at a network element caused by data units intended to be forwarded across a telecommunications network by the network element, the apparatus comprising:
   a load-data receiver for receiving load data relating to data units intended to be forwarded by the network element;
   a rate-data obtainer for obtaining data indicative of a configurable rate, said configurable rate relating to a rate at which data units are to be forwarded by the network element;
   a first register operable to have stored therein a first metric which may be updated to levels between two predetermined thresholds of the first register;
   a second register operable to have stored therein a second metric which may be updated to levels between two predetermined thresholds of the second register;
   first updater operable to update the metric in at least one of said first and second registers in dependence on said load data, said first updater being operable to update the first register in the event that such an update is insufficient to cause the metric stored in the first register to cross a first predetermined threshold thereof, and in the event that such an update would be sufficient to cause the metric stored in the first register to cross said first predetermined threshold thereof, to update the second register in the event that such an update is insufficient to cause the metric stored in the second register to cross a first predetermined threshold thereof;
   second updater operable to update the metric in at least one of said first and second registers in dependence on the configurable rate, said second updater being operable to update the second register in the event that such an update is insufficient to cause the metric stored in the second register to cross a second predetermined threshold thereof, and in the event that such an update would be sufficient to cause the metric stored in the second register to cross said second predetermined threshold thereof, to update the first register in the event that such an update would not cause the metric stored in the first register to cross a second predetermined threshold thereof; and
   a congestion indication provider responsive to said first updater and operable to provide an indication of a primary level of congestion in the event that an update by said first updater to either of said first and second registers would be sufficient to cause the metric stored in that register to cross its first respective threshold.

2. An apparatus according to claim 1 wherein said load data is dependent on a measure of the number of data units intended to be forwarded by the network element.

3. An apparatus according to claim 1 wherein said load data is dependent on a measure of the size of data units intended to be forwarded by the network element.

4. An apparatus according to claim 1 wherein said configurable rate is configured to be at a rate a predetermined amount below a maximum rate at which data units can be forwarded by the network element.

5. An apparatus according to claim 1 wherein said first and second updaters are operable to update the metrics in said first and second registers by amounts dependent respectively on said load data and on said configurable rate.

6. An apparatus according to claim 1 wherein said first updater is operable to update the metrics in said first and second registers by incrementing them in dependence on said load data, while said second updater is operable to update the metrics in said first and second registers by decrementing them in dependence on the configurable rate.

7. An apparatus according to claim 1 wherein said first updater is operable to update the metrics in said first and second registers by decrementing them in dependence on said load data, while said second updater is operable to update the metrics in said first and second registers by incrementing them in dependence on the configurable rate.

8. An apparatus according to claim 1 wherein said congestion indication provider is operable to provide an indication of a secondary level of congestion in the event that updates by said first updater to said first and second registers would cause the metrics stored in each of said registers to cross their respective thresholds, said indication of a secondary level of congestion being distinguishable from said indication of a primary level of congestion.

9. An apparatus according to claim 1 said apparatus further comprising a data unit marker responsive to said congestion indication provider, said data unit marker being operable to mark data units in response to an indication of congestion provided by the congestion indication provider.

10. An apparatus according to claim 1 said apparatus further comprising means responsive to said congestion indication provider operable to send an alert to a network management system in response to an indication of congestion provided by the congestion indication provider.

11. An apparatus according to claim 1 said apparatus further comprising means responsive to said congestion indication provider operable to drop or re-route data units in response to an indication of congestion provided by the congestion indication provider.

12. An apparatus according to claim 1 wherein the telecommunications network is the Internet.

13. An apparatus according to claim 1 wherein the telecommunications network is a core network operated by a network operator.

14. An apparatus according to claim 1 wherein said data units are packets each comprising a header in accordance with an inter-networking protocol such as a version of Internet Protocol.

15. An apparatus according to claim 1 wherein said data units are frames in accordance with an intra-networking protocol such as a version of Ethernet Protocol.

16. An apparatus according to claim 1 wherein said data units are cells in accordance with an Asynchronous Transfer Mode protocol.

17. An apparatus according to claim 1 operable to provide congestion indications relating to congestion at the network element attributable to a subset of data units intended to be forwarded by the network element, wherein said rate-data obtainer is operable to obtain data indicative of a configurable rate relating to a rate at which data units belonging to said subset are to be forwarded by the network element.

18. An apparatus according to claim 17 operable to provide class-specific congestion indications relating to congestion at the network element attributable to a subset of data units intended to be forwarded by the network element, wherein the data units of said subset have associated therewith class indications indicating that they belong to the same at least one of a plurality of different classes of data units, and wherein said rate-data obtainer is operable to obtain data indicative of a class-specific configurable rate relating to a rate at which data units belonging to said at least one class are to be forwarded by the network element.

19. An apparatus according to claim 17 operable to provide source and/or destination specific congestion indications relating to congestion at the network element attributable to a subset of data units intended to be forwarded by the network element, wherein the data units of said subset have associated therewith source and/or destination indications indicating that they have a common source and/or destination, and wherein said rate-data obtainer is operable to obtain data indicative of a source and/or destination specific configurable rate relating to a rate at which data units having source and/or destination indications indicative of a common source and/or destination are to be forwarded by the network element.

20. A network element comprising or having associated therewith at least one apparatus according to claim 1.

21. A method for using a first and a second register in combination to provide information relating to congestion at a network element caused by data units intended to be forwarded across a telecommunications network by the network element, the first register being operable to have stored therein a first metric which may be updated to levels between two predetermined thresholds of the first register, and the second register being operable to have stored therein a second metric which may be updated to levels between two predetermined thresholds of the second register, the method comprising:
receiving load data relating to data units intended to be forwarded by the network element;
obtaining data indicative of a configurable rate, said configurable rate relating to a rate at which data units are to be forwarded by the network element;
performing a load-dependent operation of updating the metric in at least one of said first and second registers in dependence on said load data, said load-dependent operation involving updating the first register in the event that such an update is insufficient to cause the metric stored in the first register to cross a first predetermined threshold thereof, and in the event that such an update would be sufficient to cause the metric stored in the first register to cross said first predetermined threshold thereof, updating the second register in the event that such an update is insufficient to cause the metric stored in the second register to cross a first predetermined threshold thereof;
performing a rate-dependent operation of updating the metric in at least one of said first and second registers in dependence on the configurable rate, said rate-dependent operation involving updating the second register in the event that such an update is insufficient to cause the metric stored in the second register to cross a second predetermined threshold thereof, and in the event that such an update would be sufficient to cause the metric stored in the second register to cross said second predetermined threshold thereof, updating the first register in the event that such an update would not cause the metric stored in the first register to cross a second predetermined threshold thereof; and
providing an indication of congestion in the event that an update to either of said first and second registers resulting from performing said load-dependent operation would be sufficient to cause the metric stored in that register to cross its respective first threshold.

22. A method according to claim 21, wherein the first and second registers in combination exhibit behaviour corresponding to that of a virtual queue.

23. An apparatus according to claim 1, wherein the first and second registers in combination exhibit behaviour corresponding to that of a virtual queue.

24. A system for providing information relating to congestion at a network element caused by data units intended to be forwarded across a telecommunications network by the network element, the system comprising:
a load-data receiver configured to receive load data relating to data units intended to be forwarded by the network element;
a first register configured to have stored therein a first metric which may be updated to levels between two predetermined thresholds of the first register;
a second register configured to have stored therein a second metric which may be updated to levels between two predetermined thresholds of the second register; and
a computer processing system, comprising a computer processor, configured to:
obtain data indicative of a configurable rate, said configurable rate relating to a rate at which data units are to be forwarded by the network element;
perform a first update to update the metric in at least one of said first and second registers in dependence on said load data, said first update updating the first register in the event that such an update is insufficient to cause the metric stored in the first register to cross a first predetermined threshold thereof, and in the event that such an update would be sufficient to cause the metric stored in the first register to cross said first predetermined threshold thereof, to update the second register in the event that such an update is insufficient to cause the metric stored in the second register to cross a first predetermined threshold thereof;
perform a second update to update to update the metric in at least one of said first and second registers in dependence on the configurable rate, said second update updating the second register in the event that such an update is insufficient to cause the metric stored in the second register to cross a second predetermined threshold thereof, and in the event that such an update would be sufficient to cause the metric stored in the second register to cross said second predetermined threshold thereof, to update the first register in the event that such an update would not cause the metric stored in the first register to cross a second predetermined threshold thereof; and provide a congestion indication responsive to said first update and to provide an indication of a primary level of congestion in the event that an update by said first update to either of said first and second registers would be sufficient to cause the metric stored in that register to cross its first respective threshold.

* * * * *